United States Patent
Ottosson et al.

(10) Patent No.: US 6,480,558 B1
(45) Date of Patent: Nov. 12, 2002

(54) SYNCHRONIZATION AND CELL SEARCH METHODS AND APPARATUS FOR WIRELESS COMMUNICATIONS

(75) Inventors: Tony Ottosson, Morrisville, NC (US); Yi-Pin Eric Wang, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/271,074

(22) Filed: Mar. 17, 1999

(51) Int. Cl.[7] .................................................. H04B 1/10

(52) U.S. Cl. ..................... 375/350; 375/354; 375/366
(58) Field of Search ................................. 375/350, 368, 375/346, 144, 150, 354; 455/422, 296; 370/503, 514

(56) References Cited

U.S. PATENT DOCUMENTS

| | | | |
|---|---|---|---|
| 5,420,850 A | * 5/1995 | Umeda et al. | 118/318 |
| 5,568,473 A | 10/1996 | Hemmati | 370/18 |
| 5,822,359 A | 10/1998 | Bruckert et al. | 375/200 |

FOREIGN PATENT DOCUMENTS

| | | |
|---|---|---|
| EP | 0 795 971 A2 | 9/1997 |
| EP | 0 876 002 A2 | 11/1998 |

OTHER PUBLICATIONS

International Search Report, PCT/US00/05669, Aug. 7, 2000.
TS 25.211 V2.4.0 (Sep. 1999), Technical Specification, 3rd Generation Partnership Project (3GPP); Technical Specification Group (TSG) Radio Access Network (RAN); Working Group 1 (WG1); Physical channels and mapping of transport channels onto physical channels (FDD), 35 pgs.

Adachi et al., "Wideband DS–CDMA for Next–Generation Mobile Communications Systems," IEEE Communications Magazine, Sep. 1998, pp. 56–69.
Dahlman, et al., "UMTS/IMT–2000 Based on Wideband CDMA," IEEE Communications Systems, Sep. 1998, pp. 70–80.

(List continued on next page.)

*Primary Examiner*—Stephen Chin
*Assistant Examiner*—Kevin Kim
(74) *Attorney, Agent, or Firm*—Myers Bigel Sibley & Sajovec

(57) ABSTRACT

A received communications signal is correlated with a common synchronization code to produce a synchronization detection signal. A component of the synchronization detection signal associated with a known synchronization signal is canceled from the synchronization detection signal to produce an interference-canceled synchronization detection signal. Timing of a synchronization signal is determined from the interference-canceled synchronization detection signal. According to one aspect, interference cancellation is achieved by generating a correlation of an estimated received known synchronization signal with the common synchronization code, canceling the correlation of the estimated received known synchronization signal with the common synchronization code from the synchronization detection signal to produce the interference-canceled synchronization detection signal. Timing of a synchronization signal may then be determined by accumulating the interference-canceled synchronization detection signal over a time interval, detecting a peak in the accumulated interference-canceled synchronization detection signal, and determining timing of a synchronization signal from the detected peak. According to another aspect, interference cancellation is achieved by accumulating the synchronization detection signal over a time interval, identifying a peak in the accumulated synchronization detection signal not associated with a known synchronization signal, and determining timing of a synchronization signal from the identified peak. Related terminal apparatus are also discussed.

50 Claims, 8 Drawing Sheets

OTHER PUBLICATIONS

Östberg et al., "Performance and Complexity of Techniques for Achieving Fast Sector Identification in an Asynchronous CDMA System," Proceedings of the 1998 Wireless Multimedia Conference, Japan, Nov. 1998, 6 pages.

Vol. 3, "Specifications of Air–Interface for 3G Mobile System," Ver. 1.0, Association of Radio Industries and Businesses (ARIB), Jan. 14, 1999, pp. 70–127.

* cited by examiner

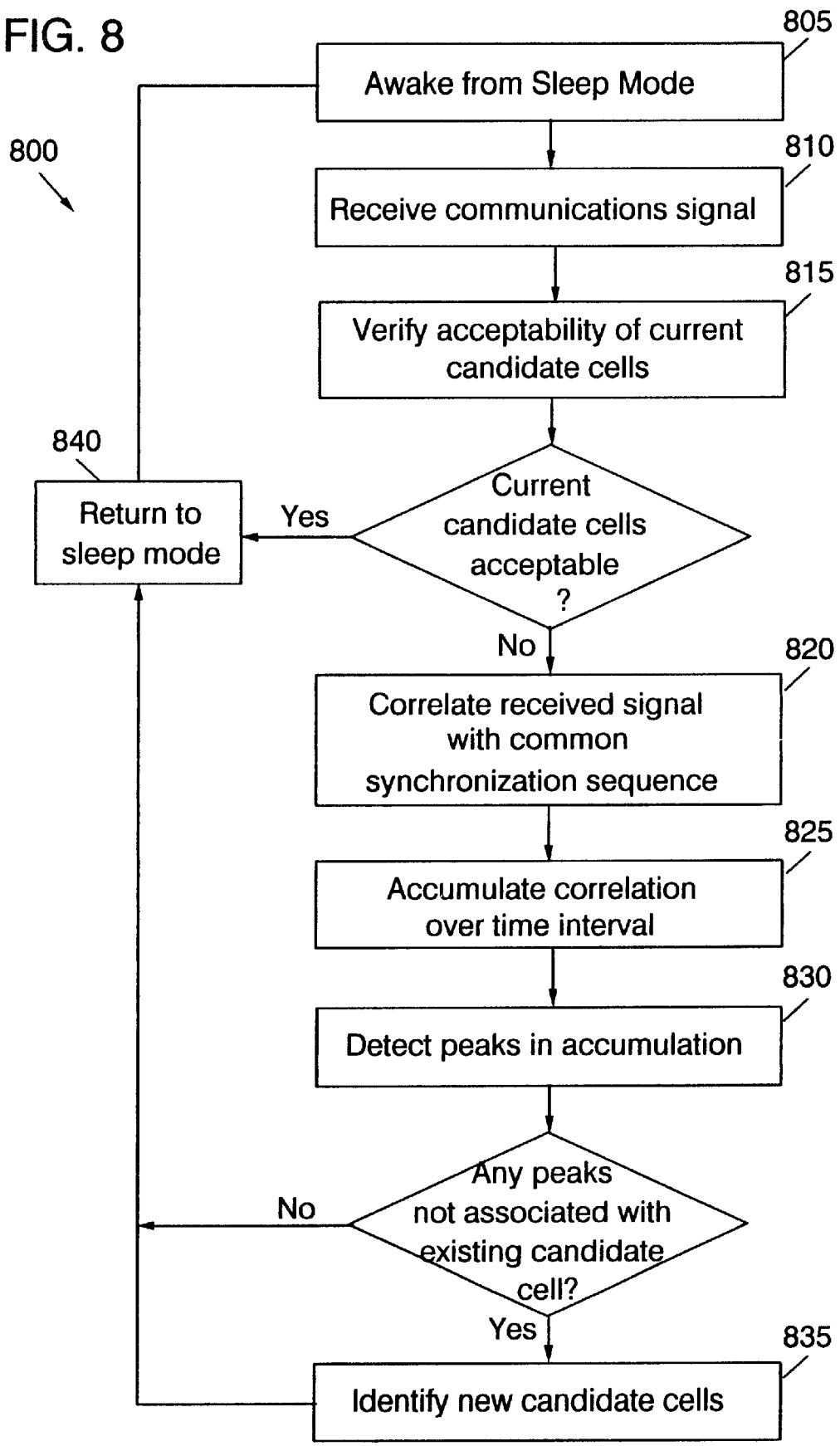

SYNCHRONIZATION AND CELL SEARCH METHODS AND APPARATUS FOR WIRELESS COMMUNICATIONS

FIELD OF THE INVENTION

The present invention relates to wireless communications systems and methods, and more particularly, to apparatus and methods for synchronization and cell search in wireless communications systems.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook,* edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

Those skilled in the art will appreciate that "cells" may have configurations other than the omnidirectional cells 24 illustrated in FIG. 1. For example, the coverage areas conceptually illustrated as a hexagonally-shaped area served by a base station 26 may actually be subdivided into three sectors using separate directional antennas mounted at the base station 26, with the sector antenna having patterns extending in three different directions. Each of these sectors may in itself be considered a "cell." As will be appreciated by those skilled in the art, other cell configurations are also possible, including, for example, overlaid cells, microcells, picocells and the like.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ a system referred to as frequency division multiple access (FDMA) to create communications channels. As a practical matter well known to those skilled in the art, radiotelephone communications signals, being modulated waveforms, typically are communicated over predetermined frequency bands in a spectrum of carrier frequencies. In a typical FDMA system, each of these discrete frequency bands serves as a channel over which cellular radiotelephones communicate with a cell, through the base station or satellite serving the cell.

The limitations on the available frequency spectrum present several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system having only several hundred allocated frequency bands.

Another technique which can further increase channel capacity and spectral efficiency is the use of time division multiple access (TDMA). A TDMA system may be implemented by subdividing the frequency bands employed in conventional FDMA systems into sequential time slots. Communications over a frequency band typically occur on a repetitive TDMA frame structure that includes a plurality of time slots. Examples of systems employing TDMA are those conforming to the dual analog/digital IS-54B standard employed in the United States, in which each of the frequency bands of the traditional analog cellular spectrum are subdivided into 3 time slots, and systems conforming to the GSM standard, which divides each of a plurality of frequency bands into 8 time slots. In these TDMA systems, each user communicates with the base station using bursts of digital data transmitted during the user's assigned time slots.

Yet another technique for potentially increasing system capacity is to employ "spread spectrum" code division multiple access (CDMA) techniques. In a system employing spread spectrum techniques, a channel may be defined by modulating a data-modulated carrier signal by a unique spreading code, i.e., a code that spreads an original data-modulated carrier over a wide portion of the frequency spectrum in which the communications system operates. Data may be recovered from the transmitted signal by demodulating the signal using the same spreading code. Because the transmitted signal is spread across a wide bandwidth, spread spectrum communications can be less vulnerable to coherent noise sources which might "jam" other communications signals. The use of unique spreading codes for channels allows several users to effectively share the same bandwidth without undue interference.

Conventional spread-spectrum communications systems commonly use so-called "direct sequence" spread spectrum modulation. In direct sequence modulation, a data-modulated carrier is directly modulated by a spreading code or sequence before being transmitted in a communications medium, e.g., an air interface. The spreading code typically includes a sequence of "chips" occurring at a chip rate that typically is much higher than the bit rate of the data being transmitted.

A direct sequence spread spectrum receiver typically includes a local sequence generator that locally produces a replica of a spreading sequence. This locally generated sequence is used to recover information from a transmitted spread spectrum signal that is modulated according to the same spreading sequence. Before information in a transmitted signal can be recovered, however, the locally generated spreading sequence typically must be synchronized with the spreading sequence that modulates the transmitted signal.

Synchronization of terminals is commonly achieved by transmitting a synchronization signal in each cell that a terminal can acquire to obtain a timing reference for synchronizing its de-spreading operations. For example, in an IS-95 compliant system, a "pilot channel" including a fixed carrier modulated by a known sequence is transmitted in each cell of the system, with a respective timing offset applied in a respective cell. In other systems, such as in systems using wideband CDMA techniques, a common synchronization code (or a code from a common set of synchronization codes) is embedded within time slots defined in data frames of a downlink channel at known locations. This sequence, sometimes referred to as a "first synchronization code" (FSC) or a "primary synchronization code" (PSC), is detected by a terminal and used to aid the terminal in determining slot timing.

As a terminal operates in a wireless cellular system, it typically seeks to identify new cells, usually neighboring cells, with which it can communicate should the signal quality of the link between the terminal and the cell with which it currently is communicating become degraded. For example, a terminal actively engaged in a call via a base station serving one cell typically needs to identify other base stations to which the call can be handed over as the terminal moves through the system. Terminals emerging from a sleep mode may also engage in cell search operations, as the synchronization signals of a set of "candidate cells" identified by the terminal before going to sleep may have degraded or even disappeared while the terminal was asleep.

The above-described synchronization signals are commonly used in such cell search operations. For example, in proposed WCDMA systems, a base station transmits over a downlink channel according to a cell-specific "long" (e.g., 40,960 chip) scrambling code that serves to identify the cell. The scrambling codes are typically divided into groups to make cell search more efficient. To identify the group to which a cell belongs, a base station typically transmits a secondary synchronization code (SSC) associated with a group to which the cell belongs, in parallel with the primary synchronization code. The SSC also typically has a period of one frame, and thus provides a reference for determining frame boundaries. In newly proposed WCDMA systems, the functions of the SSC are incorporated into the PSC by transmitting the PSC in one of a set of predetermined patterns within a frame of a synchronization signal, with the pattern representing the scrambling code group to which the cell belongs.

To perform a cell search in a system in which the PSC is transmitted at a fixed position at the beginning of a slot of a data frame, a terminal first identifies a candidate slot boundaries by correlating a received signal with the common primary synchronization code (FSC or PSC) over a predetermined time interval, e.g., 30 msec. The correlations generated are examined for peaks that indicate the presence of the PSC. Once candidate slot boundaries have been identified, a second stage is initiated in which the terminal correlates the received signal with each of the SSCs using the candidate slot boundaries. If a sufficient correlation is found between the received signal and one of the SSCs, indicating a likelihood that the cell associated with the SSC uses a long code that is a member of the group associated with the SSC, the terminal can then correlate the received signal with a relatively small set of long codes. In this manner, a cell associated with a synchronization signal can be identified in an efficient manner, without correlating a received signal with all possible long codes. Such a cell search procedure is described in detail in Version 1.0 of the "Specifications of Air-Interface for 3G Mobile System," published by Association of Radio Industries and Businesses (ARIB), Jan. 14, 1999, and in "Performance and Complexity of Techniques for Achieving Fast Sector Identification in an Asynchronous CDMA System," by Ostberg et al., published in Proceedings of the 1998 Wireless Multimedia Conference, Japan, November 1998.

The above-described cell search procedure can be adversely affected by characteristics of the radio propagation environment. For example, as the same common synchronization sequence is typically transmitted by base stations serving all of the cells of the system, the synchronization signals transmitted by the stations may interfere with one another, which can make it difficult to identify slot boundaries for a particular synchronization signal associated with a particular cell. This problem may be exacerbated in dispersive channels, where multipath components may cause additional interference.

SUMMARY OF THE INVENTION

In light of the foregoing, it is an object of the present invention to provide improved methods and apparatus for determining timing of a synchronization signal.

It is another object of the present invention to provide improved cell search methods and apparatus.

It is another object of the present invention to provide improved cell search methods and apparatus suitable for use in wideband CDMA (WCDMA) systems.

These and other objects, features and advantages are provided according to the present invention by systems and methods in which a received communications signal representing a combination of synchronization signals transmitted for cells in a wireless communications system is correlated with a common synchronization code, such as the first synchronization code (FSC) or primary synchronization code (PSC) used in a WCDMA system. A component associated with a known synchronization signal, such as a synchronization signal transmitted by a base station serving a cell maintained in a "neighbor" list at the receiving terminal, is canceled from the correlation to produce an interference canceled correlation that may be used for determining timing, e.g., slot boundaries, of a synchronization signal. The timing information may be further used to determining the identity of a cell for which the synchronization signal is transmitted, for example, by providing a timing basis for determining a scrambling group code or secondary synchronization code (SSC), which in turn is used to guide detection of a cell-specific scrambling (long) code. The interference cancellation and timing determination techniques of the present invention may also be advantageous, for example, for determining timing of synchronization signals such as the pilot channel signals broadcast in IS-95 systems.

The methods and apparatus of the present invention offer improved timing determination and cell search techniques that are potentially more efficient than conventional search techniques. Canceling signal components associated with known synchronization signals can aid in detecting slot boundaries of a desired synchronization signal, and can thus speed a cell search process. According to additional aspects of the present invention, the cells identified in a cell search process can in turn provide increase knowledge about potentially interfering synchronization signals that may be used to enhance an interference cancellation process.

In particular, according to an aspect of the present invention, a received communications signal representing a combination of synchronization signals transmitted in cells of a wireless communications system is processed. The received communications signal is correlated with a common synchronization code to produce a synchronization detection signal. A component of the synchronization detection signal associated with a known synchronization signal is canceled from the synchronization detection signal to produce an interference-canceled synchronization detection signal. Timing of a synchronization signal is determined from the interference-canceled synchronization detection signal.

According to one aspect of the present invention, interference cancellation is achieved by generating a correlation of an estimated received known synchronization signal with the common synchronization code, canceling the correlation of the estimated received known synchronization signal with the common synchronization code from the synchronization detection signal to produce the interference-canceled synchronization detection signal. Timing of a synchronization signal may then be determined by accumulating the interference-canceled synchronization detection signal over a time interval, detecting a peak in the accumulated interference-canceled synchronization detection signal, and determining timing of a synchronization signal from the detected peak. The correlation of an estimated received known synchronization signal with the common synchronization code be generated by processing filtering a representation of the known synchronization signal with an estimate of a channel over which the known synchronization signal is transmitted to produce an estimated received known synchronization signal, and correlating the estimated received known synchronization signal with the synchronization code.

According to another aspect of the present invention, interference cancellation is achieved by accumulating the synchronization detection signal over a time interval, and identifying a peak in the accumulated synchronization detection signal not associated with a known synchronization signal. Timing of a synchronization signal is determined from the identified peak. Identification of the peak may be conditioned upon the peak meeting a predetermined criterion.

The known synchronization signal may include a synchronization signal associated with a previously identified cell, such as a synchronization signal associated with a cell with which the terminal is currently communicating over a traffic channel. For example, interference cancellation may be preceded by identification of a set of synchronization signals associated with a set of candidate cells. Interference cancellation may then include canceling a component of the synchronization detection signal corresponding to a synchronization signal associated with a cell of the set of candidate cells from the synchronization detection signal to produce an interference-canceled synchronization detection signal.

In related aspects, the set of known synchronization signals may be identified by receiving a communications signal from the communications medium, identifying a synchronization signal in the received communications signal, and identifying a cell with which the identified synchronization signal is associated. The identified cell may be added to the set of candidate cells if the identified synchronization signal associated with the identified cell meets a predetermined criterion.

A respective synchronization signal may include a portion encoded according to the common synchronization code, such as the first search code (FSC) or primary search code (PSC) transmitted in a wideband CDMA (WCDMA) system. A common synchronization signal may also be transmitted in each of the cells over a pilot channel, such as conventionally done in IS-95 systems.

According to yet another aspect of the present invention, the correlating, canceling and determining are performed in response to the terminal awaking from a sleep mode. For example, a terminal may awaken from a sleep mode, receive a communications signal and evaluating a set of candidate cells based on the received communications signal. The received signal may then be correlated with the common synchronization code to produce a synchronization detection signal if the evaluated candidate cells fail to meet a predetermined criterion. The synchronization detection signal is accumulated over a time interval, and a peak in the accumulated synchronization detection signal not associated with a known synchronization signal associated with one of the candidate cells is identified. Timing for a synchronization signal may then be determined from the identified peak, and the determined timing may be used in identifying a new candidate cell associated with a synchronization signal associated with the identified peak.

Terminal apparatus operative to perform the above-described functions are also described. In one embodiment, a terminal includes an apparatus including a first correlator, e.g., a sliding correlator, operative to correlate a received communications signal with a common synchronization code to produce a synchronization detection signal. An interference canceler is responsive to the first correlator and operative to cancel a component of the synchronization detection signal associated with a known synchronization signal from the synchronization detection signal to produce an interference-canceled synchronization detection signal. A timing determiner operative to determine timing of a synchronization signal from the interference-canceled synchronization detection signal.

In another embodiment according to the present invention, the interference canceler includes a received known synchronization signal estimator that is operative to generate an estimated received known synchronization signal. A second correlator is responsive to the received known synchronization signal estimator and operative to generate a correlation of an estimated received known synchronization signal with the common synchronization code. A canceler is responsive to the first correlator and to the second correlator and operative to cancel the correlation of the estimated received known synchronization signal with the common synchronization code from the synchronization detection signal to produce the interference-canceled synchronization detection signal. The timing determiner includes an accumulator responsive to the canceler and operative to accumulate the interference-canceled synchronization detection signal over a time interval. A peak detector is responsive to the accumulator and operative to detect a peak in the accumulated interference-canceled synchronization detection signal.

In yet another embodiment according to the present invention, the interference canceler includes an accumulator responsive to the first correlator and operative to accumulate the synchronization detection signal over a time interval. A peak detector is responsive to the accumulator and operative to detect a peak in the accumulated synchronization detection signal not associated with a known synchronization signal. The timing determiner is responsive to the peak detector and operative to determine timing of a synchronization signal from the detected peak.

Improved methods and apparatus for determining timing of synchronization signals and for identifying cells associated with synchronization signals may thereby be provided.

BRIEF DESCRIPTION OF THE DRAWINGS

FIG. 8 is a flowchart illustration of exemplary operations for identifying candidate cells upon awakening from a sleep mode according to yet another aspect of the present invention.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present application describes methods and apparatus for determining timing of a synchronization signal, such as the synchronization signals transmitted in forward channels of a WCDMA system or in the pilot channel of an IS95-channel, as well as methods and apparatus for identifying cells based on the determined timing. As used herein, a "cell" refers to a mobility management entity defined in a cellular system with which terminals communicate. Cells may include cells served by respective single base stations having omnidirectional coverage, "sector cells" served by base stations having sectorized antenna arrays, and various other coverage configurations.

The terms "candidate cell," "candidate set" and the like are also used herein. Those skilled in the art will appreciate that, although in contexts such as IS-95 the terms "candidate cells" may be limited to cells which a terminal identifies as candidates for handoff, no such limitation is implied or to be inferred herein. As used herein, "candidate" generally refers to cells having synchronization signals associated therewith which have been identified, and may thus be used in the interference cancellation techniques described herein.

Figure 1:
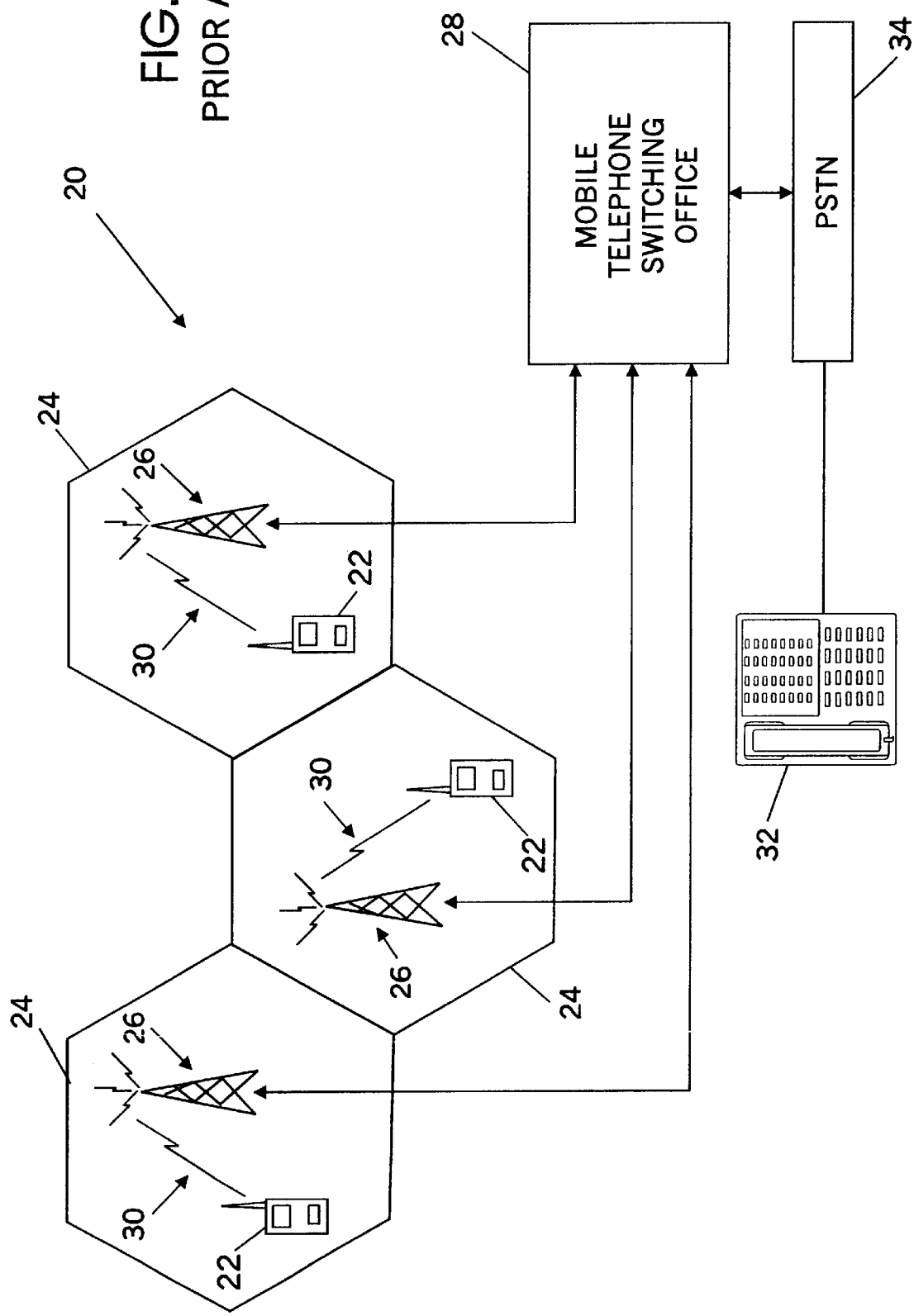
FIG. 1 is a schematic diagram illustrating a conventional terrestrial cellular wireless communications system.
Figure 2:
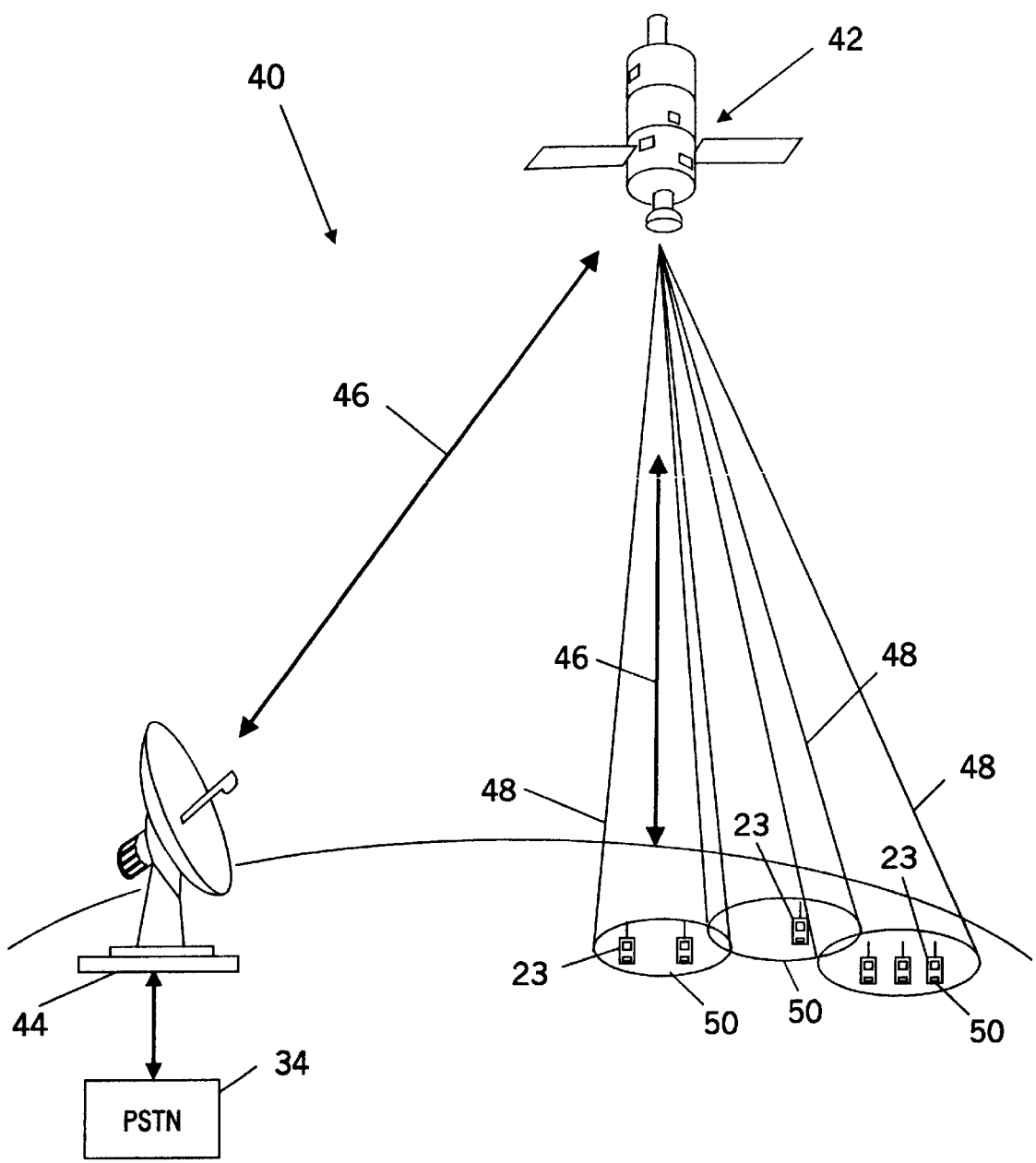
FIG. 2 is a schematic diagram illustrating a conventional satellite-based cellular wireless communications system.
Figure 3:
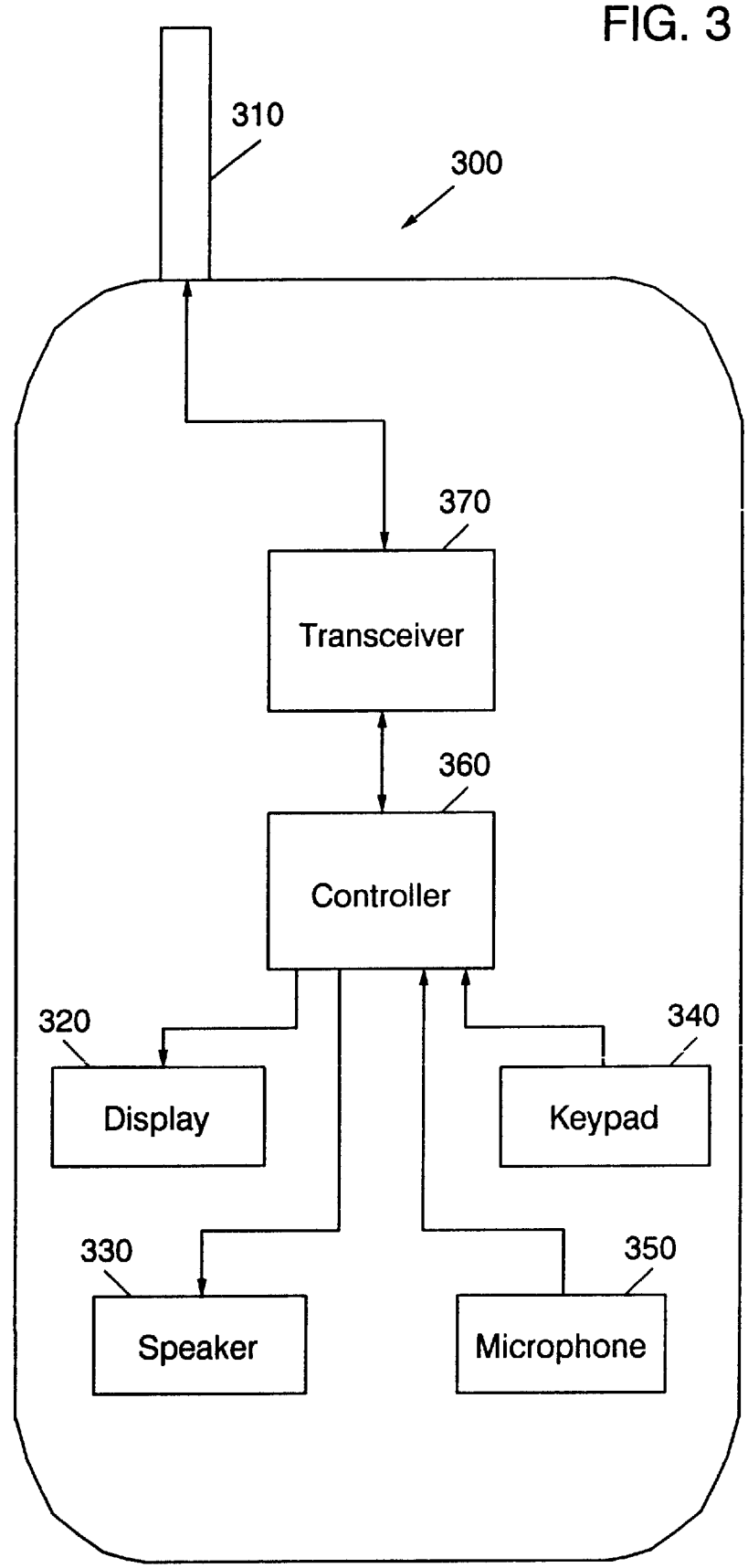
FIG. 3 is a schematic diagram illustrating a wireless terminal in which apparatus and methods according to the present invention may be embodied.

FIG. 3 illustrates a wireless terminal 300 in which apparatus and methods according to the present invention may be embodied. The terminal 300 includes an antenna 310 for receiving radio frequency (RF) signals. The terminal 300 provides a user interface including a display 320 for displaying information such as dialed numbers, short messages, directory listings and the like, and a keypad 330 for entering dialed numbers and accepting other user inputs for controlling the terminal 300. The user interface also includes a speaker 340 for producing audio signals and a microphone 350 for receiving voice information from a user. The terminal 300 also includes a controller 360 that controls and/or monitors the display 320, the keypad 330, the speaker 340, the microphone 350 and a radio transceiver 370 tied to the antenna 310. The controller 360 may include, for example, a microprocessor, microcontroller or other data processing device that is operative to load and execute computer instructions for performing the timing determination, cell search and other functions described herein.

Figure 4:
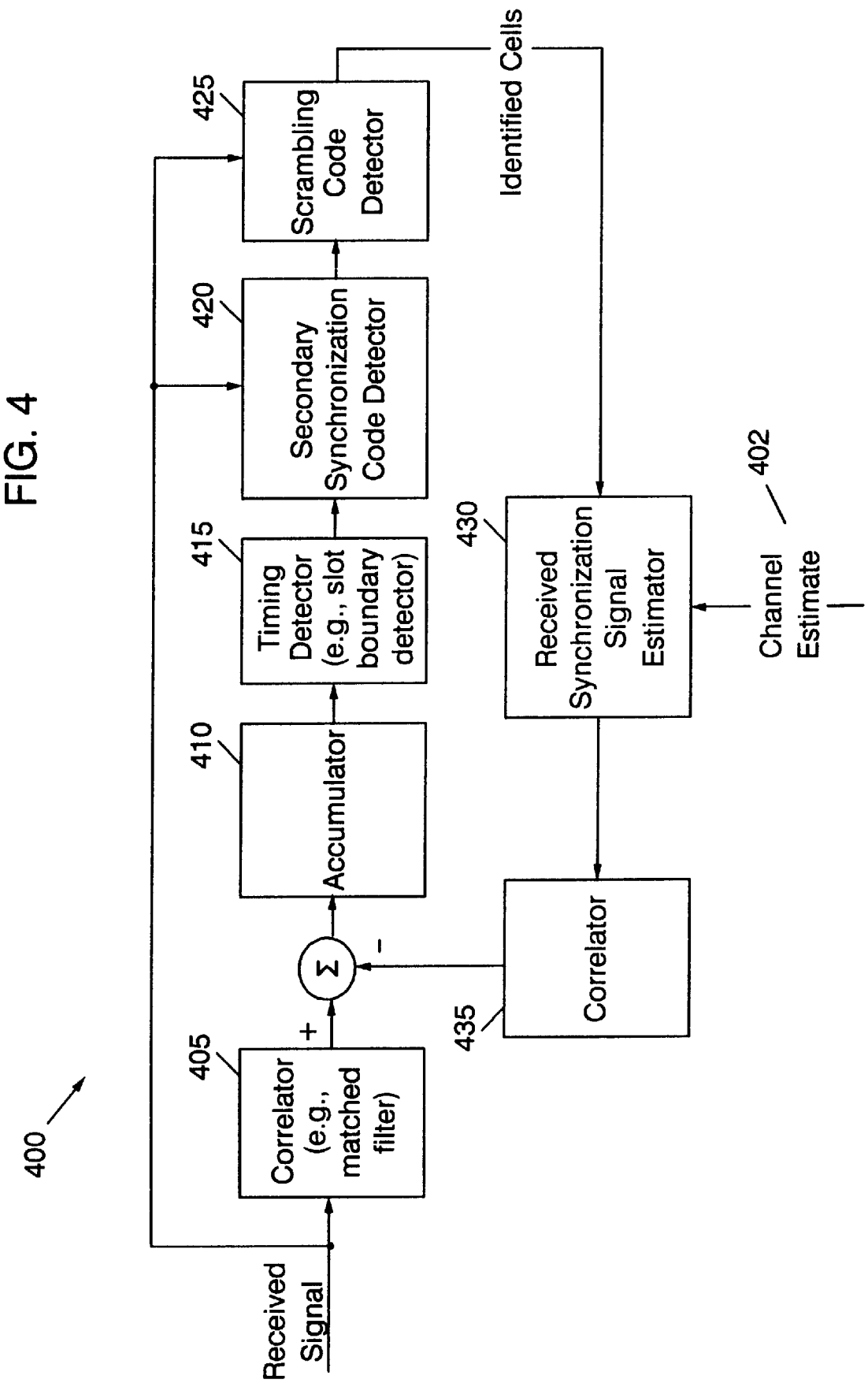
FIG. 4 is a schematic diagram of a cell identification apparatus according to an embodiment of the present invention.

FIG. 4 illustrates an exemplary cell-identification apparatus 400 that may be implemented, for example, using the controller 360 and transceiver 370 of FIG. 3. A signal received, for example, at the antenna 310 of FIG. 4 and processed to a baseband received signal by the transceiver 370 of FIG. 4, is correlated with a common synchronization code, e.g., the code used for the primary or first synchronization code (PSC or FSC) used in a WCDMA system, in a correlator 405, producing a synchronization detection signal. The correlator 405 may comprise, for example, a sliding correlator or other conventionally known correlator.

A component corresponding to a correlation of an estimate of a received, known synchronization signal is then subtracted from the synchronization detection signal produced by the correlator 405, and fed into an accumulator 410. The subtracted component may be generated by correlating the common synchronization code with an estimated received known synchronization signal generated by a received synchronization signal estimator 430 in a second correlator 435. The received known synchronization signal estimator 430 and the correlator 435 preferably produce a correlation that approximates the result of correlating a known synchronization signal produced by a previously identified cell as received at the terminal with the common synchronization code. For example, the estimate of the known signal may be constructed using a channel estimate 402 for a channel over which the known synchronization sequence is communicated. It will be appreciated that knowledge of characteristics of a known synchronization signal other than a channel estimate may be used as well, such as knowledge of signal strength, path loss, and coding applied to the known synchronization signal.

Those skilled in the art will appreciate that the component subtracted from the synchronization detection signal produced by the correlator 405 may be generated in other ways than shown in FIG. 4. For example, the functions of the received known synchronization signal estimator 435 and the correlator 435 may be combined. Computations, e.g., search code autocorrelations, used to produce the subtracted component may be precomputed and stored in the terminal.

The accumulated correlation produced by the accumulator 410 is then supplied to a timing detector 415, for example, a peak detector that identifies peaks in the accumulated correlation that may correspond to slot boundaries near which the common synchronization code is transmitted. Candidate slot boundaries thus identified may then be input to a second synchronization sequence code detector 420 that, for example, correlates the received signal with the set of secondary synchronization codes (SSCs) or "group codes" and detects the SSC having the highest correlation with the received signal. The detected SSC may then be used by a scrambling sequence detector 425 to identify a cell-specific scrambling sequence or "long code" in the set of scrambling codes associated with the detected SSC, thus identifying the cell associated with the synchronization signal. Estimates of received synchronization signals associated with the cells thus identified can then be generated, correlated with the common synchronization sequence and subtracted from correlations of a received signal to further refine timing determination and cell identification.

Figure 5:
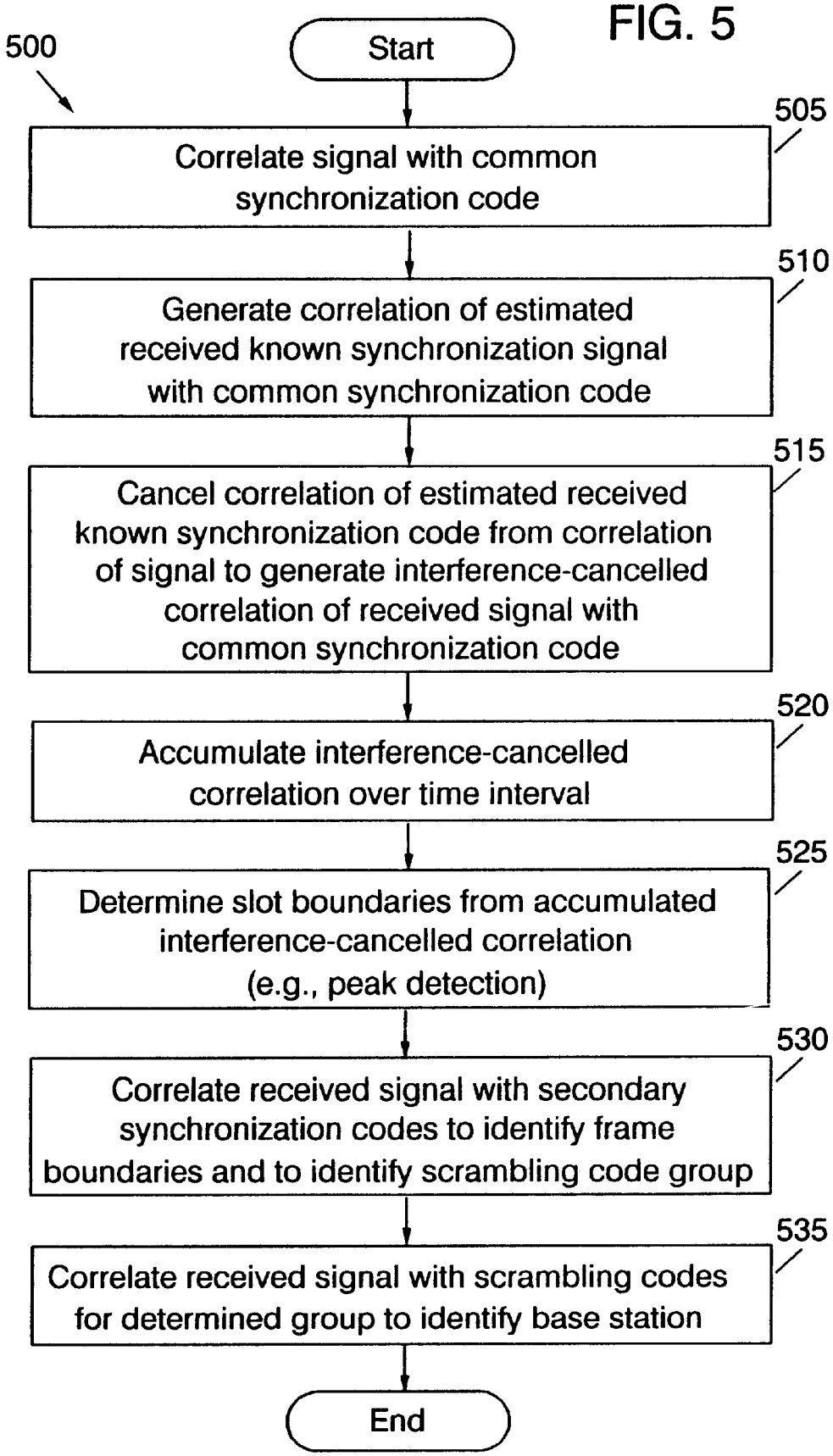
FIG. 5 is a flowchart illustration of exemplary operations for determining synchronization signal timing and for identifying an associated cell according to an aspect of the present invention.
Figure 7:
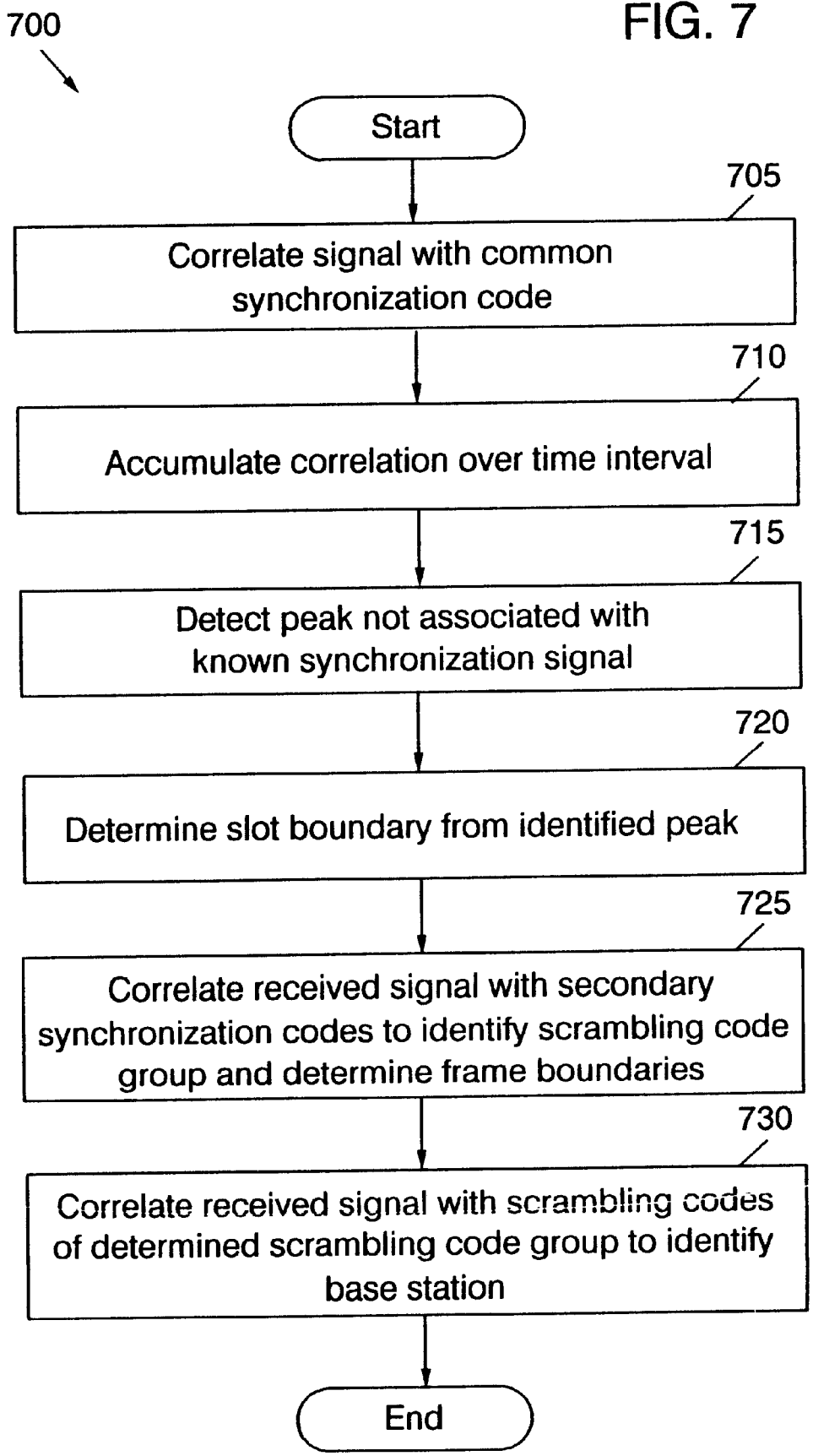
FIG. 7 is a flowchart illustration of exemplary operation for determining synchronization signal timing and for identifying an associated cell according to another aspect of the present invention.

FIGS. 5, 7 and 8 are flowchart illustrations illustrating exemplary operations for determining timing of synchronization signal and for identifying a cell associated with the synchronization signal. It will be understood that blocks of the flowchart illustrations, and combinations of blocks in the flowchart illustrations, can be implemented by computer program instructions which may be loaded onto a computer or other programmable data processing apparatus, such as the controller 360 of the terminal 300 of FIG. 3, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 5, 7 and 8 support combinations of means for performing the specified functions and combinations of steps for performing the specified functions. It will also be understood that each block of the flowchart illustrations of FIGS. 5, 7 and 8, and combinations of blocks therein, can be implemented by special purpose hardware-based computer systems which perform the specified functions or steps, or combinations of special purpose hardware and computer instructions.

Referring to FIG. 5, exemplary operations for determining timing of a synchronization signal and identifying a cell associated with the synchronization sequence include correlating a received signal with a common synchronization code (Block 505). A correlation of an estimated known synchronization signal with the common synchronization code is also generated (Block 510). The correlation of the estimated known synchronization signal is then canceled from the correlation of the received signal to generate an interference-canceled correlation of the received signal with the common synchronization code (Block 515). The interference-canceled correlation is then accumulated over a time interval (Block 520), and slot boundaries for a synchronization signal are determined from the accumulated interference-canceled correlation, e.g., by peak detection (Block 525). Continuing with cell search, the received signal is then correlated with the set of SSCs or scrambling group code to identify the SSC used to transmit a synchronization signal and to identify frame boundaries, based on the detected slot boundaries (Block 530). The identified SSC is then used to guide scrambling code detection (Block 535).

It will be appreciated that the apparatus 400 of FIG. 4 and the operations 500 of FIG. 5 may be particularly advantageous for canceling interference associated with synchronization signals transmitted by base stations serving cells with which the terminal is currently communicating, sometimes referred to as the terminal's "active set." For such cells, the terminal typically will have more detailed knowledge of channel characteristics, the cell-specific scrambling sequence used, and the like. This information may be advantageously used, for example, in constructing the estimated received synchronization signal produced by the estimator 430 of FIG. 4.

Figure 6:
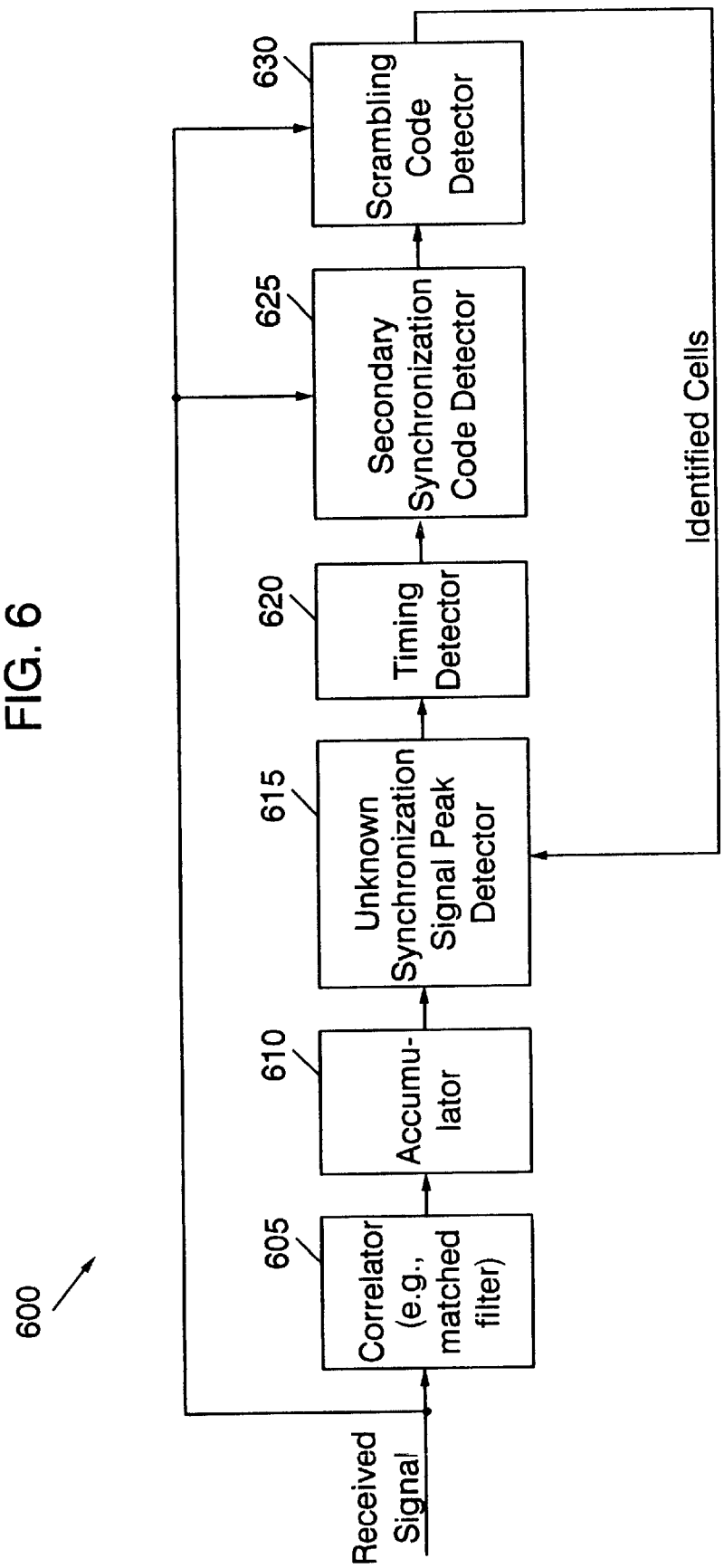
FIG. 6 is a schematic diagram of a cell identification apparatus according to another embodiment of the present invention.

FIG. 6 illustrates an exemplary cell-identification apparatus 600 according to another embodiment of the present invention. As with the apparatus 400 of FIG. 4, the apparatus 600 of FIG. 6 may also be implemented using the controller 360 and transceiver 370 of FIG. 3. A received signal is correlated with a common synchronization code, e.g., the code used for the primary or first synchronization code (PSC or FSC) used in a WCDMA system, in a correlator 605. The correlation thus produced is accumulated in an accumulator 610. A peak detector 615 detects peaks in the accumulated correlation that are not associated with a known synchronization signal, i.e., a synchronization signal transmitted for a previously identified cell.

A number of different techniques may be employed in the peak detector 615 to determine whether a peak in the accumulated correlation is associated with a known synchronization signal. For example, in a first pass, candidate slot boundaries may be identified for peaks in the accumulated correlation that meet a predetermined criterion. Cell identification (e.g., SSC detection followed by scrambling code detection) may then be performed for each identified peak to identify candidate cells. The peak locations associated with the candidate cells may then be used in the peak detector 615 to identify peaks that are not associated with the candidate cells, as peaks arising from unknown synchronization signals generally will not coincide with the peak locations associated with the candidate cells. As peaks associated with the candidate cells may change slowly over successive correlations accumulated by the accumulator 610, the terminal may need to only intermittently verify the continued presence of the known synchronization signals associated with these peak locations to update the peak locations. For multiple candidate cells and corresponding peak locations, the update procedure may be streamlined by intermittently verifying a selected subset of the peak locations using a full-blown cell identification procedure.

Still referring to FIG. 6, the peaks associated with an unknown synchronization signal may be input to a timing detector 620, e.g., a slot boundary detector that produces candidate slot boundaries. The candidate slot boundaries are used by a secondary synchronization code detector 625 that, for example, correlates the received signal with the set of secondary synchronization codes (SSCs) or "group codes" and detects the SSC having the highest correlation with the received signal. The detected SSC may then be used by a scrambling code detector 630 to identify a scrambling code (long code) in the set of scrambling codes associated with the detected SSC. The cells thus identified can then be used to guide the interference canceling peak selection process performed by the peak detector 615.

FIG. 7 illustrates exemplary operations 700 for determining timing of a synchronization signal and identifying a cell associated therewith according to another aspect of the present invention. A received signal is correlated with a common synchronization code (Block 705). The correlation is accumulated over a time interval (Block 710), a peak that is not associated with a known synchronization signal is detected (Block 715), and a slot boundary is determined from the detected peak (Block 720). The determined slot boundary is then used to guide correlation with the set of secondary synchronization codes to identify a scrambling code group and to determined frame boundaries (Block 725). The identified code group and frame boundaries are then used in correlating the received signal with a select number of scrambling codes to thereby identify a cell associated with the detected synchronization signal (Block 730).

Those skilled in the art will appreciate that the identification techniques illustrated in FIGS. 6 and 7 may be particularly advantageous in canceling interference associated with synchronization signals for which a terminal has limited knowledge. For example, the apparatus 600 and operations 700 may be advantageously used for canceling interference from synchronization signals transmitted by base stations serving cells with which the terminal is not currently communicating, and thus has limited information. The cancellation techniques illustrated in FIGS. 6 and 7 may also be combined with the techniques illustrated in FIGS. 4 and 5. For example, the cancellation techniques of FIGS. 4 and 5 may be used for cancellation of components of the correlation of the received signal that are associated with synchronization signals for which the terminals has detailed knowledge of channel conditions, scrambling code and the like, while the simplified techniques of FIGS. 6 and 7 may be used to cancel components associated with signals for which the terminal has limited information.

It will be understood that the methods and apparatus of the present invention are also applicable to synchronization signal timing determination and cell identification in environments other than the WCDMA-compliant environments described with reference to FIGS. 4–7. For example, the techniques of the present invention are applicable to determining timing of a pilot channel synchronization signal used in an IS-95 compliant wireless communications system. The present invention is also applicable for timing determination and cell search in newly proposed WCDMA systems in which the SSC is eliminated by employing a pattern of transmission of the PSC in a frame as a means for identifying code groups and frame boundaries. In such systems, for example, the interference cancellation techniques of the present invention may be used to determine both the timing and position of the PSC in a synchronization frame.

It will also be understood that the present invention is also applicable to systems which transmit synchronization signals that are encoded according to more than one common synchronization code. For example, a system may transmit a synchronization signal encoded with a primary synchronization code selected from a common set of primary synchronization codes. In such a case, for example, multiple parallel correlations and interference cancellations may be performed in place of the single correlations and cancellations illustrated in FIGS. 4 and 6, and interference cancellation performed on each of the parallel correlations.

The synchronization and timing techniques described above may be used when a terminal is in an active mode, i.e., when the terminal is actively communicating with one or more base stations. However, a terminal in sleep mode may also need to engage in a cell search in order to update the list of cells with which it may communicate. It will be understood that a terminal in sleep mode may, for example, engage in one or both the of the cell search techniques described above in reference to FIGS. 4–7.

Exemplary operations 800 for performing a simplified cell search upon awakening from sleep mode are illustrated in FIG. 8. After awakening from sleep mode (Block 805), the terminal receives a communications signal (Block 810). The terminal attempts to verify the quality of synchronization signals associated with cells in a list of candidate cells (Block 815). For example, a quality criterion based on the number of candidate cells and the signal quality of the synchronization signals associated therewith may be used, wherein greater signal is required as the number of candidate cells decreases and lesser signal quality is required as the number of candidate cells increases. It will be understood that other criteria may be used as well.

If the signals associated with the candidate cells are acceptable, the terminal returns to sleep mode (Block 840). If not, however, the received signal is correlated with a common synchronization sequence (Block 820), the correlation accumulated (Block 825), and peaks detected in the accumulated correlation (Block 830). If all of identified peaks are associated with previously identified candidate cells, the terminal returns to sleep mode (Block 840). If a peak is not associated with a known candidate, however, a cell search is performed based on the identified peak, and the cells thus identified added to the candidate list (Block 835) before the terminal returns to sleep mode (Block 840).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a wireless communications system including a plurality of cells in which synchronization signals transmitted in the cells are encoded according to a common synchronization code, a method of processing a received communications signal representing a combination of synchronization signals comprising the steps of:

correlating the received communications signal with the common synchronization code to produce a synchronization detection signal;

canceling a component of the synchronization detection signal associated with a known synchronization signal from the synchronization detection signal to produce an interference-canceled synchronization detection signal; and determining timing of a synchronization signal from the interference-canceled synchronization detection signal.

2. A method according to claim 1:

wherein said step of canceling comprises the steps of:
generating a correlation of an estimated received known synchronization signal with the common synchronization code; and canceling the correlation of the estimated received known synchronization signal with the common synchronization code from the synchronization detection signal to produce the interference-canceled synchronization detection signal; and wherein said step of determining timing comprises the steps of:
accumulating the interference-canceled synchronization detection signal over a time interval;

detecting a peak in the accumulated interference-canceled synchronization detection signal; and determining timing of a synchronization signal from the detected peak.

3. A method according to claim 2, wherein said step of generating a correlation of an estimated received known synchronization signal with the common synchronization code comprises the steps of:

filtering a representation of the known synchronization signal with an estimate of a channel over which the known synchronization signal is transmitted to produce an estimated received known synchronization signal; and correlating the estimated received known synchronization signal with the synchronization code.

4. A method according to claim 1:

wherein said step of canceling comprises the steps of:
accumulating the synchronization detection signal over a time interval; and identifying a peak in the accumulated synchronization detection signal not associated with a known synchronization signal; and wherein said step of determining timing comprises the step of determining timing of a synchronization signal from the identified peak.

5. A method according to claim 4, wherein said step of identifying a peak comprises the step of identifying a peak in the accumulated synchronization detection signal not associated with a known synchronization signal and meeting a predetermined criterion.

6. A method according to claim 4:

wherein said step of identifying a peak comprises the steps of:

identifying a plurality of peaks in the accumulated synchronization detection signal not associated with a known synchronization signal; and selecting a peak of the plurality of peaks according to a selection criterion; and wherein said step of determining timing comprises the step of determining timing of a synchronization signal from the selected peak.

7. A method according to claim 1, wherein the known synchronization signal comprises a synchronization signal associated with a previously identified cell.

8. A method according to claim 7, wherein the known synchronization signal comprises a synchronization signal associated with a cell with which the terminal is currently communicating over a traffic channel.

9. A method according to claim 7:

wherein said step of canceling is preceded by the step of identifying a set of synchronization signals associated with a set of candidate cells; and wherein said step of canceling comprises the step of canceling a component of the synchronization detection signal corresponding to a synchronization signal associated with a cell of the set of candidate cells from the synchronization detection signal to produce an interference-canceled synchronization detection signal.

10. A method according to claim 9, wherein said step of identifying a set of known synchronization signals comprises the steps of:

receiving a communications signal from the communications medium;

identifying a synchronization signal in the received communications signal;

identifying a cell with which the identified synchronization signal is associated; and adding the identified cell to the set of candidate cells if the identified synchronization signal associated with the identified cell meets a predetermined criterion.

11. A method according to claim 1, wherein a respective synchronization signal includes a portion encoded according to the common synchronization code.

12. A method according to claim 1, wherein a common synchronization signal is transmitted in each of the cells over a pilot channel.

13. A method according to claim 1, wherein said steps of correlating, canceling and determining are performed in response to the terminal awakening from a sleep mode.

14. A method according to claim 13:

wherein said step of correlating is preceded by the steps of:
awakening from a sleep mode;

receiving a communications signal from the communications medium; and evaluating a set of candidate cells based on the received communications signal;

wherein said step of correlating comprises the step of correlating the received communications signal to produce a synchronization detection signal if the evaluated candidate cells fail to meet a predetermined criterion;

wherein said step of canceling comprises the steps of:
accumulating the synchronization detection signal over a time interval; and identifying a peak in the accumulated synchronization detection signal not associated with a known synchronization signal associated with one of the candidate cells; and wherein said step of determining timing comprises the step of determining timing of a synchronization signal from the identified peak; and wherein the method further comprises the step of identifying a new candidate cell associated with the identified peak from the determined timing of the synchronization signal associated with the identified peak.

15. A method according to claim 1, wherein said steps of correlating, canceling and determining are performed while the terminal is in an active mode.

16. A method according to claim 1, wherein said step of canceling is preceded by the step of determining the component associated with the known synchronization signal based on knowledge of at least one of:

a timing of the known synchronization signal;

a channel characteristic of a channel over which the known synchronization signal is received at the terminal;

a pulse shape associated with the known synchronization signal as received at the terminal;

a path loss associated with the known synchronization signal as received at the terminal; and a code associated with the known synchronization signal.

17. A method according to claim 1:

wherein said step of canceling comprises the steps of:
generating a correlation of an estimated received first known synchronization signal with the common synchronization code;
canceling the correlation of the estimated received first known synchronization signal with the common synchronization code from the synchronization detection signal to produce an interference-canceled synchronization detection signal; and:
accumulating the interference-canceled synchronization detection signal over a time interval; and
identifying a peak in the interference-canceled synchronization detection signal not associated with a second known synchronization signal; and wherein said step of determining timing comprises the step of determining timing of a synchronization signal from the identified peak.

18. A method according to claim 1, wherein a respective one of the synchronization signals is further encoded according to a cell-specific synchronization code, and wherein said step of determining timing is followed by the steps of determining a cell-specific synchronization code based on the determined timing of the synchronization signal to thereby identify a cell associated with the cell-specific synchronization code.

19. A terminal for use with a wireless communications system including a plurality of cells for which synchronization signals transmitted in the cells are encoded according to a common synchronization code, the terminal comprising:

means for receiving a communications signal representing a combination of synchronization signals;

means, responsive to said means for receiving, for correlating the received communications signal with the common synchronization code to produce a synchronization detection signal;

means, responsive to said means for correlating, for canceling a component of the synchronization detection signal associated with a known synchronization signal from the synchronization detection signal to produce an interference-canceled synchronization detection signal; and means, responsive to said means for canceling, for determining timing of a synchronization signal from the interference-canceled synchronization detection signal.

20. A terminal according to claim 19:

wherein said means for canceling comprises:
means for generating a correlation of an estimated received known synchronization signal with the common synchronization code; and
means, responsive to said means for generating, for canceling the correlation of the estimated received known synchronization signal with the common synchronization code from the synchronization detection signal to produce the interference-canceled synchronization detection signal; and wherein said means for determining timing comprises:
means for accumulating the interference-canceled synchronization detection signal over a time interval;
means, responsive to said means for accumulating, for detecting a peak in the accumulated interference-canceled synchronization detection signal; and
means, responsive to said means for detecting, for determining timing of a synchronization signal from the detected peak.

21. A terminal according to claim 20, wherein said means for generating a correlation of an estimated received known synchronization signal with the common synchronization code comprises:

means for filtering a representation of the known synchronization signal with an estimate of a channel over which the known synchronization signal is transmitted to produce an estimated received known synchronization signal; and means, responsive to said means for filtering, for correlating the estimated received known synchronization signal with the synchronization code.

22. A terminal according to claim 19:

wherein said means for canceling comprises:
means for accumulating the synchronization detection signal over a time interval;
means, responsive to said means for accumulating, for identifying a peak in the accumulated synchronization detection signal not associated with a known synchronization signal; and wherein means for determining timing comprises means for determining timing of a synchronization signal from the identified peak.

23. A terminal according to claim 22, wherein said means for identifying a peak comprises means for identifying a peak in the accumulated synchronization detection signal not associated with a known synchronization signal and meeting a predetermined criterion.

24. A terminal according to claim 22:

wherein said means for identifying a peak comprises:
means for identifying a plurality of peaks in the accumulated synchronization detection signal not associated with a known synchronization signal; and
means, responsive to said means for identifying a plurality of peaks, for selecting a peak of the plurality of peaks according to a selection criterion; and wherein said means for determining timing comprises means for determining timing of a synchronization signal from the selected peak.

25. A terminal according to claim 19, further comprising means for storing an identification of a cell, and wherein the known synchronization signal comprises a synchronization signal associated with a stored cell identification.

26. A terminal according to claim 25, further comprising means for identifying a set of synchronization signals transmitted for a set of candidate cells, and wherein means for canceling comprises means for canceling a component of the synchronization detection signal corresponding to a synchronization signal associated with a cell of the set of candidate cells from the synchronization detection signal to produce an interference-canceled synchronization detection signal.

27. A terminal according to claim 26, wherein said means for identifying a set of known synchronization signals comprises:
- means for receiving a communications signal from the communications medium;
- means, responsive to said means for receiving, for identifying a synchronization signal in the received communications signal;
- means, responsive to said means for identifying a synchronization signal, for identifying a cell with which the identified synchronization signal is associated; and
- means, responsive to said means for identifying a cell, for adding the identified cell to the set of candidate cells if the identified synchronization signal associated with the identified cell meets a predetermined criterion.

28. A terminal according to claim 19, wherein each synchronization signal includes a portion encoded according to the common synchronization code.

29. A terminal according to claim 19, wherein a common synchronization signal is transmitted over a pilot channel in each of the cells.

30. A terminal according to claim 19, further comprising means for transitioning the terminal between an active and a sleep mode, and wherein said means for receiving, said means for correlating, said means for canceling and said means for determining are responsive to said means for transitioning to receive a communications signal, to correlate the received communications signal with a common synchronization code, to produce an interference-canceled correlation and to determine timing of a synchronization sequence from the interference-canceled correlation in response to the terminal awakening from the sleep mode.

31. A terminal according to claim 19, further comprising means for determining the component associated with the known synchronization signal based on knowledge of at least one of:
- a timing of the known synchronization signal;
- a channel characteristic of a channel over which the known synchronization signal is received at the terminal;
- a pulse shape associated with the known synchronization signal as received at the terminal;
- a path loss associated with the known synchronization signal as received at the terminal; and
- a code associated with the known synchronization signal.

32. A terminal according to claim 19:
wherein said means for canceling comprises:
- means for generating a correlation of an estimated received first known synchronization signal with the common synchronization code;
- means, responsive to said means for generating a correlation of an estimated received first known synchronization signal, for canceling the correlation of the estimated received first known synchronization signal with the common synchronization code from the synchronization detection signal to produce an interference-canceled synchronization detection signal; and
- means, responsive to said means for canceling the correlation of the estimated received first known synchronization signal, for accumulating the interference-canceled synchronization detection signal over a time interval; and
- means, responsive to said means for accumulating, for identifying a peak in the interference-canceled synchronization detection signal not associated with a second known synchronization signal; and wherein said means for determining timing comprises means for determining timing of a synchronization signal from the identified peak.

33. A terminal according to claim 19, wherein a respective one of the synchronization signals is further encoded according to a cell-specific synchronization code, and further comprising means for determining a cell-specific synchronization code based on the determined timing of the synchronization signal to thereby identify a cell associated with the cell-specific synchronization code.

34. An apparatus for processing a received communications signal in a terminal that is operative to communicate with cells in a wireless communications system, the wireless communications system including a plurality of cells for which synchronization signals transmitted in the cells are encoded according to a common synchronization code, the apparatus comprising:
- a first correlator operative to correlate the received communications signal with the common synchronization code to produce a synchronization detection signal;
- an interference canceler responsive to said first correlator and operative to cancel a component of the synchronization detection signal associated with a known synchronization signal from the synchronization detection signal to produce an interference-canceled synchronization detection signal; and
- a timing determiner operative to determine timing of a synchronization signal from the interference-canceled synchronization detection signal.

35. An apparatus according to claim 34:
wherein said interference canceler comprises:
- a received known synchronization signal estimator operative to generate an estimated received known synchronization signal;
- a second correlator responsive to said received known synchronization signal estimator and operative to generate a correlation of an estimated received known synchronization signal with the common synchronization code; and
- a canceler responsive to said first correlator and to said second correlator and operative to cancel the correlation of the estimated received known synchronization signal with the common synchronization code from the synchronization detection signal to produce the interference-canceled synchronization detection signal; and wherein said timing determiner comprises:
- an accumulator responsive to said canceler and operative to accumulate the interference-canceled synchronization detection signal over a time interval;
- a peak detector responsive to said accumulator and operative to detect a peak in the accumulated interference-canceled synchronization detection signal; and
- a timing determiner responsive to said peak detector and operative to determine timing of a synchronization signal from the detected peak.

36. An apparatus according to claim 34:
wherein said interference canceler comprises:
- an accumulator responsive to said first correlator and operative to accumulate the synchronization detection signal over a time interval;
- a peak detector responsive to said accumulator and operative to detect a peak in the accumulated synchronization detection signal not associated with a known synchronization signal; and
- wherein said timing determiner is responsive to said peak detector and operative to determine timing of a synchronization signal from the detected peak.

37. An apparatus according to claim 34, wherein each synchronization signal includes a portion encoded according to the common synchronization code.

38. An apparatus according to claim 34, wherein a common synchronization signal is transmitted over a pilot channel in each of the cells.

39. An apparatus according to claim 34, wherein said interference canceler is operative to cancel a component associated with the known synchronization signal based on knowledge of at least one of:
- a timing of the known synchronization signal;
- a channel characteristic of a channel over which the known synchronization signal is received at the terminal;
- a pulse shape associated with the known synchronization signal as received at the terminal;
- a path loss associated with the known synchronization signal as received at the terminal; and
- a code associated with the known synchronization signal.

40. An apparatus according to claim 34:
wherein said interference canceler comprises:
- a received known synchronization signal estimator operative to generate an estimated received first known synchronization signal;
- a second correlator responsive to said received known synchronization signal estimator and operative to generate a correlation of an estimated received first known synchronization signal with the common synchronization code;
- a canceler, responsive to said first correlator and to said second correlator and operative to cancel the correlation of the estimated received first known synchronization signal with the common synchronization code from the synchronization detection signal to produce an interference-canceled synchronization detection signal;
- an accumulator responsive to said canceler and operative to accumulate the interference-canceled synchronization detection signal over a time interval; and
- a peak detector responsive to said accumulator and operative to detect a peak in the interference-canceled synchronization detection signal not associated with a second known synchronization signal; and
- wherein said timing determiner is operative to determine timing of a synchronization signal from the identified peak.

41. A method of processing a received communications signal representing a combination of synchronization signals comprising:
- correlating the received communications signal with a synchronization code to produce a synchronization detection signal;
- estimating a component of the synchronization detection signal associated with a known synchronization signal based on knowledge of the known synchronization signal;
- canceling the estimated component of the synchronization detection signal associated with the known synchronization signal from the synchronization detection signal to produce an interference-canceled synchronization detection signal; and
- determining timing of a synchronization signal from the interference-canceled synchronization detection signal.

42. A method according to claim 41, wherein said step of canceling comprises:
- generating a correlation of an estimated received known synchronization signal with the synchronization code; and
- canceling the correlation of the estimated received known synchronization signal with the synchronization code from the synchronization detection signal to produce the interference-canceled synchronization detection signal.

43. A method according to claim 42, wherein said step of determining timing comprises:
- accumulating the interference-canceled synchronization detection signal over a time interval;
- detecting a peak in the accumulated interference-canceled synchronization detection signal; and
- determining timing of a synchronization signal from the detected peak.

44. A method according to claim 42, wherein said step of generating a correlation of an estimated received known synchronization signal with the common synchronization code comprises:
- filtering a representation of the known synchronization signal with an estimate of a channel over which the known synchronization signal is transmitted to produce an estimated received known synchronization signal; and
- correlating the estimated received known synchronization signal with the synchronization code.

45. A method according to claim 41:
wherein said step of canceling comprises the steps of:
- accumulating the synchronization detection signal over a time interval; and
- identifying a peak in the accumulated synchronization detection signal not associated with a known synchronization signal; and
wherein said step of determining timing comprises the step of determining timing of a synchronization signal from the identified peak.

46. An apparatus comprising:
- means for correlating a received communications signal with a synchronization code to produce a synchronization detection signal;
- means for estimating a component of the synchronization detection signal associated with a known synchronization signal based on knowledge of the known synchronization signal;
- means for canceling the estimated component of the synchronization detection signal associated with the known synchronization signal from the synchronization detection signal to produce an interference-canceled synchronization detection signal; and
- means for determining timing of a synchronization signal from the interference-canceled synchronization detection signal.

47. An apparatus according to claim 46, wherein said means for canceling comprises:

- means for generating a correlation of an estimated received known synchronization signal with the synchronization code; and
- means for canceling the correlation of the estimated received known synchronization signal with the synchronization code from the synchronization detection signal to produce the interference-canceled synchronization detection signal.

48. An apparatus according to claim 47, wherein said means for determining timing comprises:

- means for accumulating the interference-canceled synchronization detection signal over a time interval;
- means for detecting a peak in the accumulated interference-canceled synchronization detection signal; and
- means for determining timing of a synchronization signal from the detected peak.

49. An apparatus according to claim 47, wherein said means for generating a correlation of an estimated received known synchronization signal with the common synchronization code comprises:

- means for filtering a representation of the known synchronization signal with an estimate of a channel over which the known synchronization signal is transmitted to produce an estimated received known synchronization signal; and
- means for correlating the estimated received known synchronization signal with the synchronization code.

50. An apparatus according to claim 46:

wherein said means for canceling comprises:
- means for accumulating the synchronization detection signal over a time interval;
- means for identifying a peak in the accumulated synchronization detection signal not associated with a known synchronization signal; and wherein said means for determining timing comprises means for determining timing of a synchronization signal from the identified peak.

* * * * *